(12) United States Patent
Kuenzi et al.

(10) Patent No.: US 11,451,469 B2
(45) Date of Patent: Sep. 20, 2022

(54) ON-DEMAND TABLE AND ROUTE UPDATE AFTER A NODE FAILURE IN A WIRELESS NETWORK

(71) Applicant: Carrier Corporation, Palm Beach Gardens, FL (US)

(72) Inventors: Adam Kuenzi, Silverton, OR (US); Michael Lang, Oregon City, OR (US); Chih-Kuang Lin, Clonee (IE); Davide Villa, Cork (IE)

(73) Assignee: CARRIER CORPORATION, Palm Beach Gardens, FL (US)

( * ) Notice: Subject to any disclaimer, the term of this patent is extended or adjusted under 35 U.S.C. 154(b) by 25 days.

(21) Appl. No.: 17/076,179

(22) Filed: Oct. 21, 2020

(65) Prior Publication Data

US 2021/0119905 A1 Apr. 22, 2021

(30) Foreign Application Priority Data

Oct. 21, 2019 (EP) ..................................... 19204382

(51) Int. Cl.
| | |
|---|---|
| *H04L 45/28* | (2022.01) |
| *H04L 45/00* | (2022.01) |
| *H04W 40/34* | (2009.01) |
| *H04B 17/318* | (2015.01) |
| *H04W 40/28* | (2009.01) |

(52) U.S. Cl.
CPC ........... *H04L 45/28* (2013.01); *H04B 17/318* (2015.01); *H04L 45/20* (2013.01); *H04W 40/28* (2013.01); *H04W 40/34* (2013.01)

(58) Field of Classification Search
CPC ......... H04L 45/28; H04L 45/20; H04L 45/48; H04L 45/22; H04B 17/318; H04W 40/28; H04W 40/34; H04W 40/248; H04W 4/80; H04W 24/04

See application file for complete search history.

(56) References Cited

U.S. PATENT DOCUMENTS

| | | | |
|---|---|---|---|
| 7,978,725 B2 | 7/2011 | Gong et al. | |
| 2002/0176370 A1* | 11/2002 | Ohba | H04L 49/309 370/252 |
| 2004/0156318 A1* | 8/2004 | Rune | H04W 92/02 370/338 |

(Continued)

OTHER PUBLICATIONS

European Search Report for Application No. 19204382.6; dated Mar. 13, 2020; 6 Pages.

*Primary Examiner* — Joshua Kading
(74) *Attorney, Agent, or Firm* — Cantor Colburn LLP

(57) ABSTRACT

A method for a network 300 including a plurality of nodes, the method including: detecting, at a first node (N2), that a second node (N1) is a failed node; recording, at the first node, that the second node is a failed node and that a first path is unavailable; switching, at the first node, to a second path, the second path including a third node (N6); checking, at the first node, the hop count of the third node, wherein the third node is the next hop on the second path; generating an information packet at the first node, wherein the information packet comprises a unique ID of the failed node and the hop count of the first node; broadcasting the information packet from the first node (N2) to one or more one-hop neighbouring nodes (N1, N3, N6) of the first node.

14 Claims, 3 Drawing Sheets

(56) References Cited

U.S. PATENT DOCUMENTS

| | | | |
|---|---|---|---|
| 2004/0156384 A1* | 8/2004 | Rune | H04W 40/02 |
| | | | 370/432 |
| 2007/0070909 A1* | 3/2007 | Reeve | H04L 45/28 |
| | | | 370/238 |
| 2013/0279410 A1* | 10/2013 | Dublin, III | H04L 45/127 |
| | | | 370/328 |
| 2014/0181573 A1* | 6/2014 | Goss | H04L 45/021 |
| | | | 710/305 |
| 2016/0182359 A1* | 6/2016 | Otomo | H04L 41/06 |
| | | | 370/216 |
| 2022/0015006 A1* | 1/2022 | Di Marco | H04W 40/248 |

* cited by examiner

ON-DEMAND TABLE AND ROUTE UPDATE AFTER A NODE FAILURE IN A WIRELESS NETWORK

FOREIGN PRIORITY

This application claims priority to European Patent Application No. 19204382.6, filed Oct. 21, 2019, and all the benefits accruing therefrom under 35 U.S.C. § 119, the contents of which in its entirety are herein incorporated by reference.

TECHNICAL FIELD

The present disclosure relates to Bluetooth networks, particularly to methods for dealing with node failure in a Bluetooth low energy network.

BACKGROUND

The Bluetooth® Low Energy (BLE) specification is a set of standards for wireless network technologies operating within the 2.4-2.4835 GHz Industrial, Scientific and Medical (ISM) band. BLE is designed to considerably reduce power consumption compared to legacy, or "Classic", Bluetooth® devices.

Applications for the BLE specification include healthcare, security, fitness, and home entertainment. Within these applications, devices may utilise Bluetooth mesh profiles to communicate with other BLE devices in a network. Each device in the network can transfer data between other devices in the network, creating a so-called "mesh".

According to the specification, a BLE device operates across 40 channels in the 2.4 GHz band, each mapped onto a set of RF (radio frequency) channel index values 0, 1, . . ., 39. Channels 0 to 36 are used for the transmission of data while channels 37, 38, and 39 are for the transmission of advertising (ADV) events.

The term "node" as used herein may refer to any device that may have BLE capability. Such devices may include smartphones, smart plugs, light bulbs, laptops, home entertainment devices or any other device that can connect to a BLE network. A node may also be able to communicate in other wireless networks, such as Wi-Fi® networks or cellular networks. A node may also be able to communicate via the Internet through such networks.

Some networks may be self-healing, meaning that, in the event of the failure of a node in the network, the network is able to circumvent the failed node to ensure data packets can still be delivered to their destinations. However, current methods for doing so are energy and resource intensive, which can be particularly concerning for networks comprising battery powered nodes or for large and dense networks where network updates can be time consuming.

SUMMARY

Viewed from a first aspect, the invention provides a method for a network comprising a plurality of nodes, comprising: detecting, at a first node, that a second node is a failed node; recording, at the first node, that the second node is a failed node and that a first path that includes the second node is unavailable; switching, at the first node, to a second path, the second path comprising a third node; checking, at the first node, the hop count of the third node, wherein the third node is the next hop on the second path; generating an information packet at the first node, wherein the information packet comprises a unique ID of the failed node and the hop count of the first node; broadcasting the information packet from the first node to one or more one-hop neighbouring nodes of the first node; storing, at each of the one-hop neighbouring nodes that receives the information packet, the unique ID of the failed node and the hop count of the first node; and recalculating, at each of the one-hop neighbouring nodes that receives the information packet, the hop count, wherein if the hop count at a one-hop neighbouring node is recalculated to be different from the hop count prior to receiving the information packet the one-hop neighbouring node generates a second information packet comprising the new hop count of the one-hop neighbouring node and broadcasts the second information packet to one or more of its own one-hop neighbouring nodes.

An advantage of the present invention is to improve the robustness and the response times of wireless networks in the event of node failure. This method ensures that network information remains up-to-date, enabling each node in the network to choose working routes through the network to save energy and resources and avoid failed nodes. This is particularly important in networks where some or all of the nodes are constrained by being battery-powered.

Viewed from a second aspect, the invention provides a Bluetooth Low Energy (BLE) network comprising multiple nodes comprising: a first node; a second node; and one or more neighbouring nodes, wherein the neighbouring nodes are a one-hop distance from the first node; wherein the first node is configured to detect that the second node is a failed node, record that the second node is a failed node and that a first path is unavailable, switch to a second path, the second path comprising a third node, check the hop count of the third node, wherein the third node is the next hop on the second path, generate an information packet, wherein the information packet comprises a unique ID of the failed node and the hop count of the first node, and broadcast the information packet to one or more one-hop neighbouring nodes; and wherein each of the one-hop neighbouring nodes that receives the information packet is configured to store the unique ID of the failed node and the hop count of the first node, and recalculate the hop count, wherein if the hop count at a one-hop neighbouring node is recalculated to be different from the hop count prior to receiving the information packet the one-hop neighbouring node generates a second information packet comprising the new hop count of the one-hop neighbouring node and broadcasts the second information packet to one or more of its own one-hop neighbouring nodes.

Viewed from a third aspect, the invention provides a computer program product containing instructions that, when executed within a Bluetooth Low Energy network comprising multiple nodes, will configure the network to operate in accordance with the method of the first aspect.

The following describes optional features that may be combined with the method of the first aspect, the network of the second aspect or the computer program product of the third aspect.

The BLE devices may include any device that has the ability to communicate with other devices using Bluetooth low energy transmissions. Such devices may include smartphones, smart plugs, light bulbs, laptops, access control systems, and home entertainment devices. BLE devices may be members of a BLE network. The BLE network may comprise a head node or gateway, where the head node is able to perform protocol conversions communicate data from the BLE network to another network that the head node is connected to. Other networks may include cellular networks, the Internet, a local intranet, and cloud networks.

In the BLE network, the BLE devices that are members of the network may be called nodes. The network may comprise any number of nodes and may be distributed so that the head node is connected to at least one node. Each node in the network may be connected directly to the head node or is connected to the head node via at least one other node. In this way, the head node is able to communicate with all nodes in a BLE network, and vice versa.

All nodes in the network may be considered to be downstream or downlink with respect to the head node and, conversely, the head node may be considered upstream or uplink of other nodes in the network. The structure of the network may be that data can travel from the head node and through other intermediary nodes before reaching a destination node. In this way, intermediary nodes may be upstream of some nodes and may be downstream of other nodes. A node that is at the edge of a network may be called an end node. Data that is transmitted from the head node to an intermediary node or end node may be considered to be travelling downstream or downlink. Data that is transmitted from an end node or intermediary node in the direction of the head node may be considered to be travelling upstream or uplink.

The BLE network may be configured to allow BLE devices to join and leave networks on the fly. The skilled person would readily understand that BLE networks may be configured to be restructured to account for new devices joining the network or current devices leaving the network. The skilled person would also readily understand that a BLE network may be configured to restructure itself to account for changes in the physical location of BLE devices in the network and/or optimise the network for efficient data transfer between devices.

The distance any particular node is away from the head node may be defined by the number of nodes data must travel through to reach that particular node. For example, a node that directly communicates with the head node may be considered one "hop" away from the head node. Likewise, a first node that communicates with the head node via a second node may be considered to be two "hops" away from the head node. In this latter case, the second node may be considered to be downstream of the head node and also upstream of the first node. In this way, it is possible to define how many hops any particular node is away from the head node. The number of hops has no bearing on the physical distance between nodes. Nodes that are one hop away from a particular node may be called neighbours of that particular node.

The hop distance for a particular node may change due to a reconfiguration of the network. Such a reconfiguration may occur for any number of reasons including, but not limited to: optimisation of the network; in response to the number of nodes in the network changing; and the physical movement of nodes in the network.

The hop distance for a particular node may be stored in the memory of said node as identifying data for that node. Other identifying data may include a node ID (identification) number or a MAC (media access control) address for the node. The node may store identifying data for other nodes in the network, such as neighbouring nodes. The node ID may be a unique identification of the node.

The first path of the first node may be part of a longer path from an initial sending node to a destination node, where the sending node may be considered as a node from which a data packet originated. Alternatively, the sending node may be considered as any node from which data was sent. The destination node may be considered to be a node to which a data packet is intended to reach. Alternatively, a destination node may be any node that receives a data packet. The path for a data packet may comprise multiple hops through multiple nodes to reach a destination node. The node(s) on a path between a sending node and a destination node may be called intermediary nodes. The terms "path" and "route" may be used interchangeably.

Typically, a path between a sending node and a destination node may require as few intermediary nodes as possible, and may not even require any intermediary nodes at all. There may be multiple paths from any one node in the network for data to be sent along to reach a destination node. A node would typically select a path based upon the lowest hop count, but may also determine which path to use by considering other parameters, such as: RSSI (Received Signal Strength Indicator); the battery level of the node; workload and traffic congestion in the network as a whole or in the local neighbourhood of the node; or whether the next node in a path is part of a subnet and whether that subnet is the same subnet as the current node is in.

Nodes in the network may draw information from a routing table. The routing table contains information on about the topology of the network. Nodes may draw information from the routing table, such as node IDs or routing paths for data delivery.

The on-demand table update method may be more clearly defined as comprising generating an information packet; broadcasting the information packet from the first node to one-hop neighbouring nodes of the first node; and recalculating, at each of the one-hop neighbouring nodes that receives the information packet, the hop count, wherein if the hop count at a one-hop neighbouring node is recalculated to be different from the hop count prior to receiving the information packet, then the one-hop neighbouring node triggers the on-demand table update.

A purpose of the on-demand table update may be to inform the one-hop neighbours of a particular node about a change that has occurred in the network. The update may be triggered by one of the following conditions: if a first node discovers a failed node or if the first node recalculates its hop count and the new hop count is different to the hop count prior to the. One or both of these conditions may trigger an on-demand table update.

A failed node may be discovered when a sending node attempts to send a data packet along a route to a node and finds that the delivery is unsuccessful. Therefore, if the delivery of a data packet is unsuccessful due to a failed node, then an on-demand update is triggered. The discovery of a failed node may include the sending node declaring, to the best of its knowledge, that the next hop in a path along which a data packet is being sent has failed since the sending node was not able to establish any connection with the failed node for a certain period of time.

When a first node triggers the on-demand table update, it generates a broadcast information packet. The information packet may comprise the hop distance of the first node and the node IDs of any failed nodes that have been discovered. Then, the first node sends the information packet to each of its one-hop neighbours. Upon receipt of the information packet, a second node updates the hop distance of the first node from which the packet was sent and re-computes its own hop distance. If the hop distance of the second node has changed, the on-demand table update triggers recursively and the second node generates and broadcasts a new broadcast information packet. Additionally, the second node may store the IDs of any failed nodes and checks if any of the failed nodes are a one-hop neighbour to the second node. If so, the second node is configured to invalidate routes using a neighbouring failed node so that those routes are not selected for future data packet delivery.

The broadcast information packet may have a lower priority than the data packet that triggered the on-demand update, and so the information packet may be sent after the data packet or a potential failure notification packet. This is because the network is configured to transfer the data packet to its final destination as soon as possible. Additionally, if a further node failure is discovered, a node is able to include new information regarding the failed node ID and its recalculated hop count in one information packet, rather than generating and sending multiple information packets for each node failure encountered.

The potential failure notification packet may be part of a possible multi-path failure recovery method. The potential failure notification packet may be a class of packets has higher priority compared to the current data packet. The potential failure notification packet may be sent back to the original source of the message in order to inform the source node about the failure node and the inability to perform delivery of the data packet to the final destination through the current path. Upon reception of the potential failure notification packet, the original source node may then choose an alternative path for delivery of the data packet to the final destination node.

The number of one-hop neighbours connected to a particular node may be dependent on the topology and density of a network. In some situations, this number may be high and so the time and energy required to broadcast an information packet to each of these nodes in the event of an on-demand update may be too resource-intensive. In such situations, the node may be configured to perform a ranking of its one-hop neighbours. This ranking may be based upon different parameters such as: hop distance; whether they are members of a subnetwork within the wider network; and the received signal strength indicator (RSSI). In this way, a node may rank each of its one-hop neighbours according to one or more of these parameters to determine which nodes are those that have a higher importance in the network. Such importance may be determined from these parameters and are in view of the data throughput and connectivity of these nodes. One may imagine that it would be imperative to update the nodes which are most frequently used or are in positions boasting the most connectivity in the network with information pertaining to failed nodes so that data packets passing through these nodes may avoid delays in reaching their destinations. The ranking method proposed aims to find more relevant neighbouring nodes for alternative paths around the failed node while reducing information packet broadcast overhead cost. An information packet may then be sent to only a subset of all the available on-hop nodes starting from the highest ranked node. A greater amount of the network may be updated by a larger subset, but this may also result in higher latency and energy use for the delivery of the data packet that triggered the network update. The subset size may depend on the level of network update wanted, which may take into account the network density, node connectivity, and available data paths.

Restoration of a failed node may be integrated back into the network by a network reset to refresh all the routes and all the information of all neighbours of the newly restored node. Alternatively, the restored node may follow joining protocols to be reintegrated in the network, for instance, by informing the neighbours that it is newly available and so all the routes that use it as intermediate node are back to normal. Other methods of reintegrating restored nodes are known to the person skilled in the art and may be used depending on particular parameters of the network.

In addition to the on-demand table update, the network may also utilise an on-demand route update method to deal with node failures in the network. While the on-demand table update is concerned with updating nodes in the network with the status and information concerning particular nodes, the on-demand route update method instead concerns itself with providing an update of failed routes data packets may take through the network. The update may be triggered in particular circumstances or may occur continuously, where the latter is more resource intensive than the former but has an advantage of ensuring that the network is up to date throughout all of the network.

One condition for the triggering of the on-demand route update may be the detection of a failed node. When a sending node discovers a failed node during delivery of a data packet, the link between the sending node and the failed node may be recorded at the sending node as being unavailable. Then, the sending node may check the routing table for the network to determine whether that link is used by other routes already created both uplink and downlink. If so, then an on-demand route update is triggered.

The on-demand route update may comprise sending, from a sending node, an information packet to the original source of a path comprising a failed link if that link is part of an uplink route, or to the head node if that link is part of a downlink path. When the final node to which the information packet is being sent to receives the information packet, the final node invalidates the notified path so that the path containing the failed link is not used in a future data delivery. Any intermediary nodes between the sending node and the final node may also record paths containing the failed link as being invalid.

The information packet in the on-demand route update may have a lower priority than that of the original data packet, meaning that the information packet is sent after the data packet if both packets are to be sent from the same node.

An advantage of using the on-demand route update in conjunction with the on-demand table update is that a network may be more comprehensively updated in the event of failed nodes being discovered in the network. This may allow a network to be more adaptable in response to node failure and able to self-heal to ensure effective and efficient data delivery through the network without the need for an external operator to continually maintain the system.

BRIEF DESCRIPTION OF THE DRAWINGS

Certain embodiments of the disclosure will now be described by way of example only and with reference to the accompanying drawings in which.

DETAILED DESCRIPTION

Figure 1:
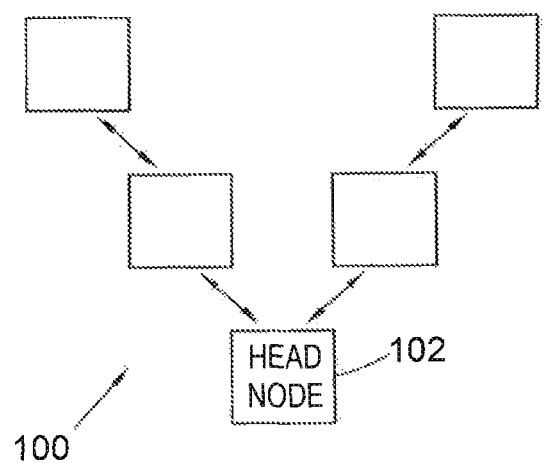
FIG. 1 shows an exemplary BLE network.

FIG. 1 shows an example BLE network 100 where the network 100 is depicted as a tree. A head node 102 forms the "root" of the network 100 and devices in the BLE network form "branches" in the network. Some BLE devices are not directly connected to the head node 102; instead they are connected via a branch node. This means that any transmissions sent from the head node 102 may have to be communicated through another BLE node before the transmission reaches its destination node.

Figure 2:
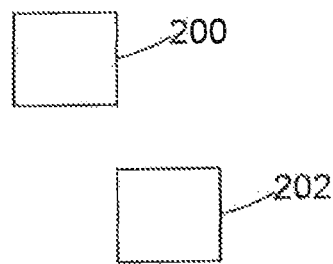
FIG. 2 shows a pair of BLE devices.

FIG. 2 shows a first node 200 and a second node 202. The first node 200 and the second node 202 may be any two adjacent nodes in a BLE network 100. Here, the term "adjacent" means that the first node 200 and second node 202 are configured to communicate with one another directly, rather than through an intermediate node. Each node may be able to determine its position in a BLE network 100 relative to other nodes by storing identifying information about its neighbours. Neighbouring nodes may be defined as those that are immediately connected to a node in the network 100. Identifying information may include hop distance and a unique node ID.

Figure 3:
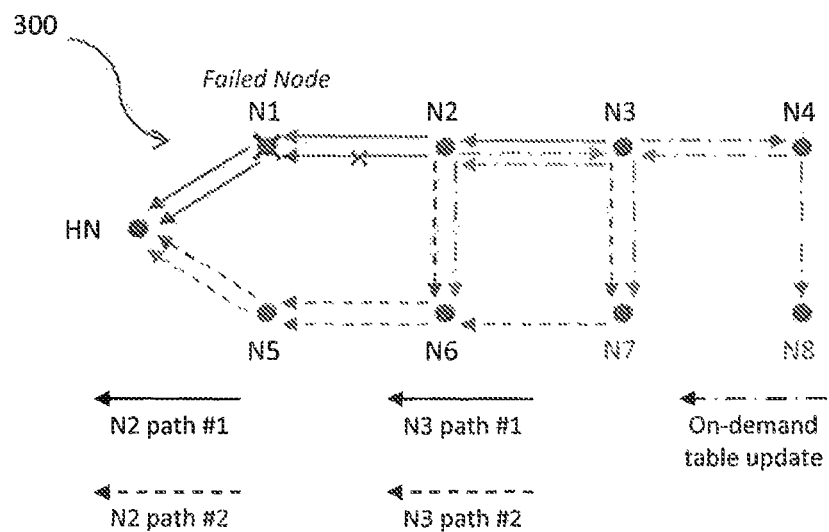
FIG. 3 illustrates an exemplary network on which an on-demand table update method of the present invention may be carried out.

The on-demand table update method will now be described as acting on a network 300 as depicted in FIG. 3. This example network 300 comprises a head node NH and a plurality of nodes N1-N8, where nodes N1 and N5 are one hop from the head node NH. Nodes N2 and N6 are, respectively, two hops from the head node NH via N1 and N5, nodes N3 and N7 are, respectively, three hops from the head node NH via N2 and N6, and nodes N4 and N8 are, respectively, four hops from the head node NH via N3 and N6. Additionally, the nodes N2 and N6 are one hop from one another, as are node N3 and N7, and nodes N4 and N8.

Node N2 wants to send a data packet to the head node NH via a path #1. Upon attempting to do so, N2 discovers that node N1 has failed and the data packet cannot be properly received. At this point, node N2 updates the information of node N1 marking the link N1-N2 as being unavailable. Node N2 then re-computes its own hop distance and discovers that the hop distance has changed from 2 (passing via N1) to 3 (passing via N6). The on-demand table update is triggered since at least one of the conditions is satisfied, though in this case both conditions are satisfied. Therefore, the node N2 generates a broadcast information packet and, first of all, tries to push the data packet through its second path #2 via node N6, since the data packet has higher priority. After this delivery is completed, the information packet can be served.

In this example, the network is very small and simple, and so there is no need to use a ranking of the neighbouring one-hop nodes and the information packet can be sent to all the neighbours (N3 and N6). Upon the reception of the info message, the node N3 and N6 update the hop count distance of node N2 and re-compute their own hop distances. The hop distance of node N6 is not changed since it relies on node N5. Node N3, on the other hand, has changed its hop distance from 3 to 4, since the path to the head node NH from node N3 relied on node N2.

Additionally, if node N3 has the information regarding all of the intermediate nodes on a path between the node N3 and the head node NH, node N3 is configured to invalidate the path since it contains failed node N1. Node N3 is then configured to select an alternate path to the head node NH which circumvents the failed node N1. This may be repeated at other nodes that receive the information packet, and so all nodes that receive the information packet would invalidate any paths stored at those nodes which contain failed node N1.

The change in hop distance at node N3 triggers the on-demand update at node N3 and the node N3 generates another information broadcast packet. This packet is sent to each of the neighbours of node N3, nodes N2, N4, and N7. As nodes N2 and N7 have paths to the head node NH that do not rely on node N3, there is no change in the hop distance at these nodes. A path to the head node NH from node N4 does, however, relies on node N3, and so N4 then the hop distance of node N4 changes from 4 to 5. This change in hop distance then triggers the on-demand update at node N4. This process continues until no more hop distance changes occur.

Figure 4:
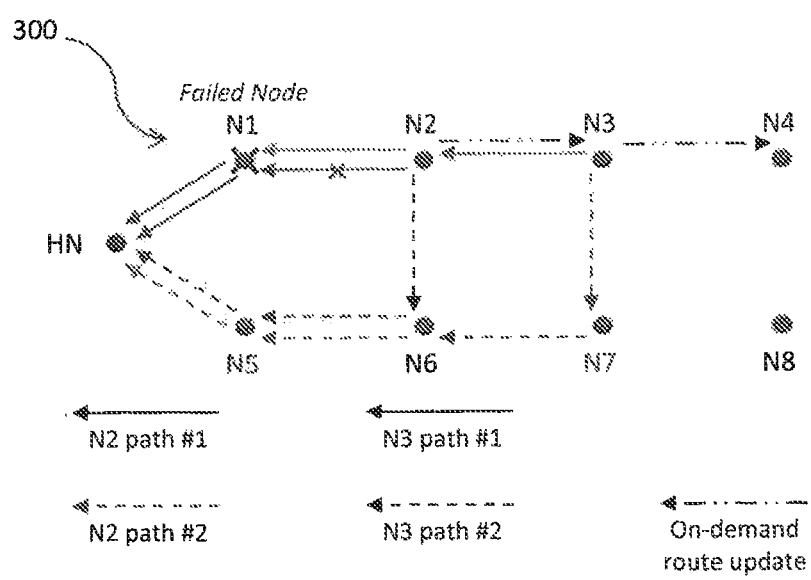
FIG. 4 illustrates an exemplary network on which an on-demand route update method of the present invention may be carried out.

In addition to the on-demand table update, the network 300 may also utilise an on-demand route update method to deal with node failures in the network 300. While the on-demand table update is concerned with updating nodes in the network 300 with the status and information concerning particular nodes, the on-demand route update method instead concerns itself with providing an update of failed routes data packets may take through the network 300. The network 300 may use the on-demand route update instead of or in addition to the on-demand table update described above. FIG. 4 shows the same network 300 as in FIG. 3 and illustrates how the on-demand route update is carried out.

One condition for the triggering of the on-demand route update is the detection of a failed node. When a sending node N2 discovers a failed node N1 during delivery of a data packet, the link between the sending node N2 and the failed node N1 may be recorded at the sending node N1 as being unavailable. Then, the sending node N1 may check the routing table for the network 300 to determine whether that link is used by other routes already created, both uplink and downlink of the sending node N2. If so, then an on-demand route update is triggered.

The on-demand route update comprises sending, from a sending node N1, an information packet to the original source of a path comprising a failed link if that link is part of an uplink route such as leaf node N4, or to the head node NH if that link is part of a downlink path. When the final node to which the information packet is being sent to receives the information packet, the final node invalidates the notified path so that the path containing the failed link is not used in a future data delivery. Any intermediary nodes between the sending node and the final node also record paths containing the failed link as being invalid.

In this example, the node N3 also uses the unavailable link N1-N2 in its path #1. Therefore, node N3 is going to invalidate that path. In a future packet delivery, node N3 would use its path #2 which has node N7 as an intermediary node. Node N4 follows the same trend as node N3 in that node N4 invalidates its path #1 through node N3 and it will use its path #2 through node N8. The paths for node N4 are not showed in FIG. 4 for ease of viewing.

Figure 5:
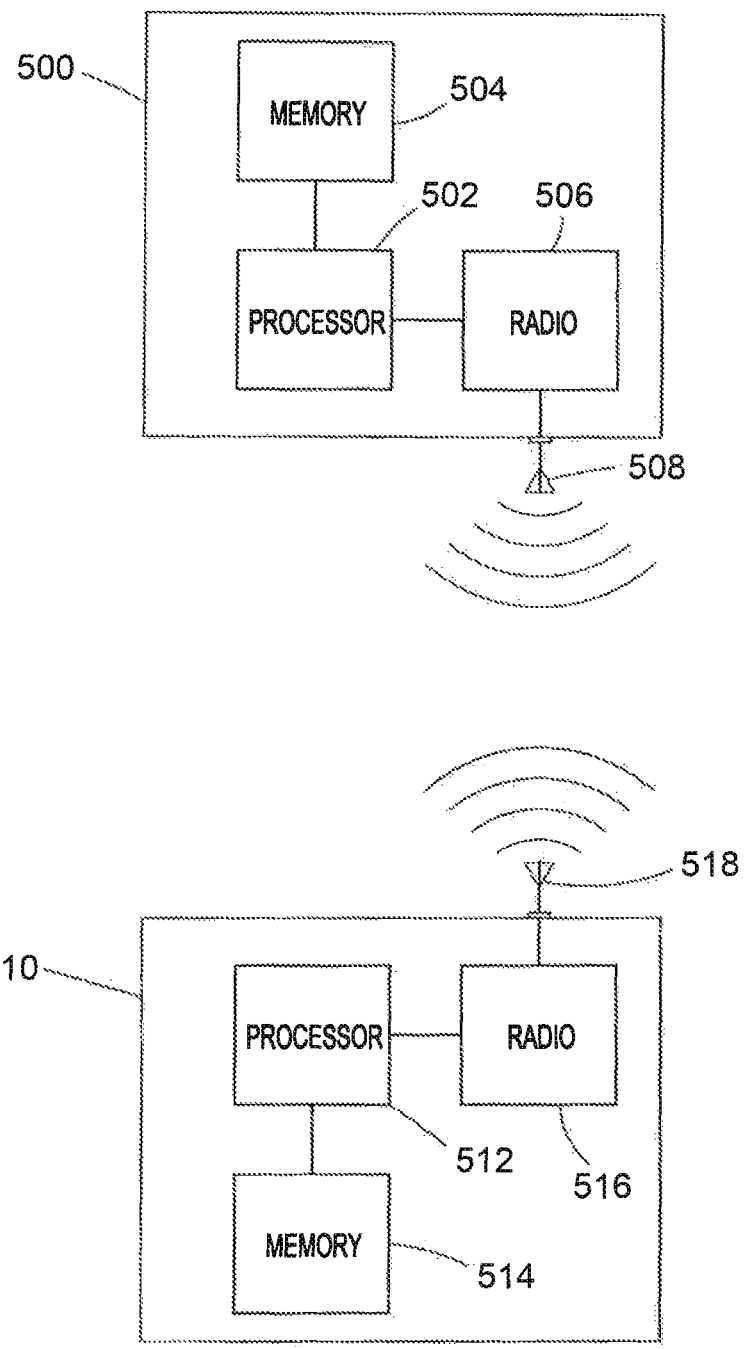
FIG. 5 shows a schematic view of a pair of BLE devices.

FIG. 5 illustrates a pair of BLE devices 500, 510 which may utilise the methods discussed above. The BLE devices 500, 510 might be any suitable known type of device, and they are modified compared to the known devices to operate in accordance with a method as set out above. A first BLE device 500 comprises a processor 502, a memory unit 504, a radio 506, and an antenna 508. Computer program products for performing the methods described herein may be stored as an application in the memory unit 504. The memory unit 504 can be a hard drive, solid state or optical memory source. The processor 502 is configured to access and execute software, applications, and data stored on the memory unit 504.

The radio 506 is configured to receive and transmit BLE signals via the antenna 508. The processor 502 is configured to interface with the radio 506 and the application may be configured to control the radio 506 and antenna 508 when executed on the processor 502.

A second BLE device 510 includes similar hardware and operations to the first BLE device 500. The antenna 508 of the first BLE device 500 is configured to communicate with the antenna 518 of the second BLE device 510.

What is claimed is:

1. A method for a network (300) comprising a plurality of nodes, comprising:
   detecting, at a first node (N2), that a second node (N1) is a failed node;
   recording, at the first node, that the second node is a failed node and that a first path is unavailable;
   switching, at the first node, to a second path, the second path comprising a third node (N6);
   checking, at the first node, a hop count of the third node, wherein the third node is a next hop on the second path from the first node;
   generating an information packet at the first node, wherein the information packet comprises a unique ID of the failed node and a hop count of the first node;
   broadcasting the information packet from the first node (N2) to one or more one-hop neighbouring nodes (N1, N3, N6) of the first node;
   storing, at each of the one-hop neighbouring nodes that receives the information packet, the unique ID of the failed node (N1) and the hop count of the first node;
   recalculating, at each of the one-hop neighbouring nodes that receives the information packet, a new hop count, wherein, if the new hop count at one of the one-hop neighbouring nodes is different from a hop count of the one-hop neighbouring node prior to receiving the information packet, the one-hop neighbouring node generates a second information packet comprising the new hop count of the one-hop neighbouring node and broadcasts the second information packet to one or more of its own one-hop neighbouring nodes.

2. The method of claim 1, wherein the first node sends a data packet from the first node to the second node along the first path, wherein the second node is a failed node and the data packet is not successfully sent to the second node.

3. The method of claim 1, wherein if the third node has a hop count different from a hop count of the second node, updating the hop count of the first node.

4. The method of claim 1, wherein the first node broadcasts the information packet to all of its one-hop neighbouring nodes.

5. The method of claim 1, wherein the first node is configured to rank each of its one-hop neighbours according to parameters which include: a hop count; whether they are members of a subnetwork within the network (300); and a received signal strength indicator (RSSI).

6. The method of claim 5, wherein the first node sends the information packet to a subset of the total number of one-hop neighbouring nodes starting from the top-ranking one-hop neighbouring node.

7. The method of claim 1, wherein the first node utilises an on-demand route update, comprising:
   sending, from the first node, a third information packet to a source of a path comprising a failed link if that link is part of an uplink route, or to a head node (HN) if that link is part of a downlink path, wherein when a destination node of the third information packet receives the third information packet, the destination node invalidates the path comprising the failed link so that the path containing the failed link is not used in a future data delivery.

8. The method of claim 7, wherein any intermediary nodes between the first node and the destination node records paths containing the failed link as being invalid.

9. The method of claim 7, wherein the third information packet has a lower priority than that of other data packets.

10. The method of claim 1, wherein the first path is a path along which a data packet travels from a source node to a destination node.

11. The method of claim 10, wherein the first path comprises one or more intermediate nodes.

12. A Bluetooth Low Energy (BLE) network (300) comprising multiple nodes comprising:
   a first node (N2);
   a second node (N1); and
   one or more one-hop neighbouring nodes (N1, N3, N6), wherein the one-hop neighbouring nodes are a one-hop distance from the first node;
   wherein the first node is configured to detect that the second node is a failed node (N1), record that the second node is a failed node and that a first path is unavailable, switch to a second path, the second path comprising a third node, check a hop count of the third node, wherein the third node is a next hop on the second path from the first node, generate an information packet, wherein the information packet comprises a unique ID of the failed node and a hop count of the first node, and broadcast the information packet to one or more of the one-hop neighbouring nodes; and
   wherein each of the one-hop neighbouring nodes (N1, N3, N6) that receives the information packet is configured to store the unique ID of the failed node and the hop count of the first node, and recalculate a new hop count, wherein, if the new hop count at one of the one-hop neighbouring nodes is different from a hop count of the one-hop neighbouring node prior to receiving the information packet, the one-hop neighbouring node generates a second information packet comprising the new hop count of the one-hop neighbouring node and broadcasts the second information packet to one or more of its own one-hop neighbouring nodes.

13. A Bluetooth Low Energy (BLE) network (300) as claimed in claim 12, wherein the network (300) is configured to operate in accordance with the method of claim 1.

14. A non-transitory computer program product containing instructions that, when executed within a Bluetooth Low Energy (BLE) network (300) comprising multiple nodes, will configure the network (300) to operate in accordance with the method of claim 1.

* * * * *